R. J. Hollingsworth,
Soldering Clamp.
N° 63,892.   Patented Apr. 16, 1867.
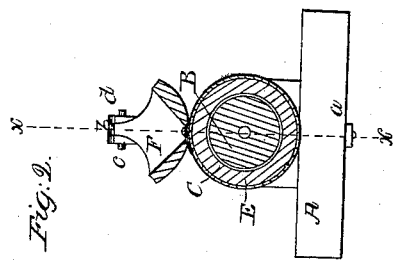
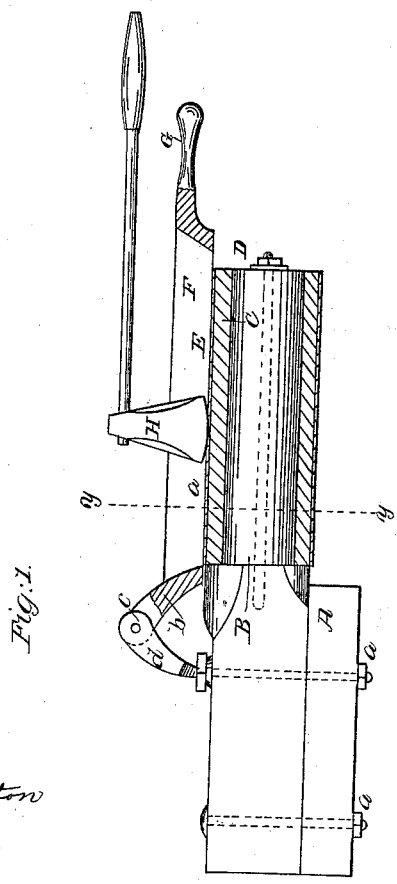
Witnesses.            Inventor.

United States Patent Office.

ROBERT J. HOLLINGSWORTH, OF CINCINNATI, OHIO.

Letters Patent No. 63,892, dated April 16, 1867.

---

IMPROVED DEVICE FOR SEAMING SHEET-METAL CANS.

---

*The Schedule referred to in these Letters Patent and making part of the same.*

---

TO ALL WHOM IT MAY CONCERN:

Be it known that I, ROBERT J. HOLLINGSWORTH, of Cincinnati, in the county of Hamilton, and State of Ohio, have invented a new and improved Device for Seaming or Soldering Sheet-Metal Cans, Spouting, etc.; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, fig. 2.

Figure 2, a transverse vertical section of the same, taken in the line $y\ y$, fig. 1.

Similar letters of reference indicate like parts.

This invention relates to a new and simple device for expediting the work of seaming or soldering sheet-metal cans, spouting, and other cylindrical articles, constructed of sheet metal, and which are secured by solder. The invention consists of a metal cylindrical form to receive the sheet-metal cylinder to be soldered in connection with an adjustable solder trough, all arranged as hereinafter set forth.

A represents a block or base, to which a horizontal arm, B, is secured by bolts $a$. The portion of this arm B which projects beyond the block or base A is of cylindrical form, and has metal tube C secured upon it by a clamp, D, in the end of arm B. This metal tube C constitutes what I term a form, as the sheet-metal cylinder E to be soldered is placed upon it. Tubes C of different diameters are employed according to the diameter of the cylinders to be soldered. F is what I term a solder trough, the same being of V-form in its transverse section, with a narrow discharge opening, $a$, at its bottom, and extending the whole length of the trough. One end of this trough is provided with a handle, G, and the opposite end is provided with an arm $b$, which is secured by a rivet or pivot, $c$, in the upper end of the swivel $d$, which may be on one of the bolts $a$. H represents the soldering iron, which may be of the ordinary or any proper construction.

The operation is as follows: The cylinder E bent in proper form is fitted on the tube or form C, the lapped ends to be soldered being adjusted on the uppermost side or part of the tube or form C, and the trough F is then adjusted over the seam or lapped ends of the cylinder E, the discharge opening $a$ being directly over the seam, and a piece of solder, $e$, is placed in the trough F. The iron, H, properly heated, is then moved along in the trough F over the solder and the seam formed in a perfect manner, the lower end or bottom of the trough serving as a guide for the solder and causing the same to be very evenly and nicely distributed on or over the joint or lapped ends of the cylinder E. It will be seen that by this simple means the work of soldering will not only be greatly expedited, but also performed in a more perfect manner than hitherto.

Having thus described my invention, I claim as new, and desire to secure by Letters Patent—

The tube or form C, in combination with the solder trough F, arranged for joint operation in connection with a soldering-iron, H, substantially as and for the purpose specified.

The above specification of my invention signed by me this    , day of May, 1866.

ROBERT J. HOLLINGSWORTH.

Witnesses:
WM. F. MCNAMARA,
ALEX. F. ROBERTS,